(12) United States Patent
Choi et al.

(10) Patent No.: US 8,411,414 B2
(45) Date of Patent: Apr. 2, 2013

(54) METAL OXIDE ELECTRODE MATERIAL, AND ELECTROCHEMICAL CAPACITOR USING THE SAME AND MANUFACTURING PROCESS FOR PRODUCING THE SAME

(75) Inventors: Dong Hyeok Choi, Gyeonggi-do (KR);
Hyun Chul Jung, Gyeonggi-do (KR);
Jun Hee Bae, Gyeonggi-do (KR); Hak Kwan Kim, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 445 days.

(21) Appl. No.: 12/621,320

(22) Filed: Nov. 18, 2009

(65) Prior Publication Data
US 2011/0063777 A1   Mar. 17, 2011

(30) Foreign Application Priority Data

Sep. 16, 2009  (KR) ........................ 10-2009-0087298

(51) Int. Cl.
*H01G 9/00*  (2006.01)
(52) U.S. Cl. ...................................... 361/502; 361/503
(58) Field of Classification Search .......... 361/502–503, 361/508, 516
See application file for complete search history.

(56) References Cited

U.S. PATENT DOCUMENTS

| 6,770,398 | B1 | 8/2004 | Atwater et al. | |
| 2009/0225498 | A1* | 9/2009 | Lee et al. | 361/523 |

FOREIGN PATENT DOCUMENTS

| JP | 2001-332256 | | 11/2001 |
| JP | 2008218105 A | * | 9/2008 |
| KR | 10-2008-0893228 B1 | | 3/2008 |
| KR | 10-2005-0066495 A | | 7/2008 |
| KR | 10-2009-0076277 A | | 7/2009 |

OTHER PUBLICATIONS

Robertson et al., Nonstoichiometric layered LixMnyO2 intercalation electrodes—a multiple dopant strategy, Jul. 10, 2003, J Mater. Chem., 2003, vol. 13, pp. 2367-2373.*

* cited by examiner

*Primary Examiner* — Eric Thomas
(74) *Attorney, Agent, or Firm* — McDermott Will & Emery LLP

(57) ABSTRACT

The present invention relates to a metal oxide electrode material, an electrochemical capacitor using the same, and a method for producing the same. More particularly, the present invention relates to a metal oxide electrode material substituting a sublattice location of metal for one or more kinds of different metals, an electrochemical capacitor using the same, and a method for producing the same in metal oxides constituting an electrochemical capacitor electrode.

8 Claims, 8 Drawing Sheets

- PRIOR ART -

FIG. 2 - PRIOR ART -

METAL OXIDE ELECTRODE MATERIAL, AND ELECTROCHEMICAL CAPACITOR USING THE SAME AND MANUFACTURING PROCESS FOR PRODUCING THE SAME

CROSS-REFERENCE TO RELATED APPLICATIONS

This application claims the benefit of Korean Patent Application No. 10-2009-0087298 filed with the Korea Intellectual Property Office on Sep. 16, 2009, the disclosure of which is incorporated herein by reference.

BACKGROUND OF THE INVENTION

1. Field of the Invention

The present invention relates to a metal oxide electrode material and an electrochemical capacitor using the same, and a method for producing the same. More particularly, the present invention relates to a metal oxide electrode material substituting a sublattice location of metal for one or more kinds of different metals, an electrochemical capacitor using the same, and a method for producing the same in metal oxides constituting an electrochemical capacitor electrode.

2. Description of the Related Art

In general, an electronic device called a capacitor as a device storing electricity in a physical mechanism without a chemical reaction or a phase change takes charge of collecting and discharging the electricity to stabilize electrical flow in a circuit. The capacitor has a very short charging/discharging time, a long lifespan, and very high power density, but since the capacitor has very low energy density, the capacitor is limitative to be used as an energy storage device.

On the contrary, a rechargeable battery as a device capable of storing high-density energy is used as an energy storage medium of portable electronic apparatuses such as a notebook, a cellular phone, a PDA, etc. Recently, a research on a lithium ion battery has been actively in progress.

An electrochemical capacitor is being in the limelight as a storage medium used for an electronic apparatus requiring high energy density and high power density by expressing a medium characteristic between two devices. FIG. 1 shows a correlation between energy density and power density of energy storage devices and in FIG. 1, the electrochemical capacitor expresses a medium characteristic between a general capacitor and a general rechargeable battery.

The electrochemical capacitor is referred to as a super capacitor, an electrical double layer capacitor, an ultracapacitor, or the like. With a latent application probability of the electrochemical capacitor as the energy storage medium in various fields such as wind power generation, a hybrid electric vehicle, an electric vehicle, etc., world countries are enormously interested in the electrochemical capacitor.

The most important part of the super capacitor is an electrode material, which should have a large specific surface area, have high electroconductivity having minimum voltage drop distribution in an electrode, and have an electrochemical stabilization characteristic under a predetermined potential, and in addition, it should be low in cost for commercialization.

The super capacitor is classified into three types in accordance with an electrode and a mechanism primarily used as shown in FIG. 2. Three types include (1) an electric double layer capacitor generally using activated carbon as an electrode and having charge absorption of an electrical double layer as a mechanism, (2) a metal oxide electrode pseudocapacitor (alternatively, redox capacitor) using transition metal oxide or conductive polymer as the electrode material and having pseudo-capacitance as the mechanism, and (3) a hybrid capacitor having a medium characteristic between the capacitors.

A basic structure of the super capacitor is constituted by a porous electrode, an electrolyte, a current collector, and a separator. The super capacitor has an electrochemical mechanism in which ions in electrolyte solution move on an electric field and absorb on the surface of the electrode to generate electricity by applying a voltage of several volts to both terminal of a unit cell as an operation principle.

In case of the activated carbon electrode material, since specific capacitance is in proportion to the specific surface area, energy density according to high capacity of the electrode material is increased by granting porosity. The electrode is manufactured by making a carbon electrode material, a carbon conductive material, and a polymer binder in a slurry form and applying them to the current collector. It is important to reduce a contact resistance while increasing an adhesion force to the current collector and reduce an internal contact resistance between activated carbons by varying the type and ratio of the binder, the conductive material, and the electrode material.

In case of the metal oxide electrode material, since transition metal oxide which is advantageous in capacity has resistance lower than activated carbon, it is possible to manufacture a super capacitor having high-output characteristics and in recent years, when amorphous oxide is used as the electrode material, it is reported that non-capacitance is remarkably increased. Recently, it has been reported that the metal oxide electrode material shows power and energy densities better than the known electrode using only the transition metal oxide by oxidizing only the surface using nitride having electrical conductivity better than the oxide by P. N. Kumta et al.

Meanwhile, in case of the hybrid capacitor for combining the advantages of the capacitors, a research to increase operating voltage and improve energy density by using an asymmetric electrode is actively in progress. The hybrid capacitor is a capacitor that maintains power characteristics thereof by using a material having an electrical double layer characteristic, that is, carbon for one electrode and improves overall energy of a cell by using an electrode showing an oxidation-reduction mechanism having a high-capacity characteristic.

In particular, in recent years, the super capacitor serves as a braking regenerative power supply of an electrical vehicle, such that a research to maintain an advantage an EDLC and improve energy density has been actively in progress by an increase in capacity of an electrode material and an increase in density of an electrode, and modification of a manufacturing process.

As a result, the inventor has developed a metal oxide electrode increasing low electrical conductivity of the known metal oxide and having remarkably increased non-capacitance and energy density and a high-power and high-density super capacitor using the same.

SUMMARY OF THE INVENTION

An object of the present invention is to provide a metal oxide electrode having increased electrical conductivity in comparison with the known metal oxide and having remarkably increased non-capacitance and energy density and a high-power and high-density super capacitor using the same.

In order to achieve the above-mentioned object, the present invention provides a metal oxide electrode material configuring an electrochemical capacitor electrode, wherein a sublattice location of metal is substituted for one or more kinds of different metals.

Further, in order to achieve the above-mentioned object, the present invention provides an electrochemical capacitor constituted by a porous electrode, an electrolyte, a collector, and a separator, wherein the porous electrode is made of metal oxide of which a metal sublattice location is substituted for one or more kinds of different metals.

Further, in order to achieve the above-mentioned object, a method for producing a metal oxide electrode material may further include: i) a first step of preparing metal oxide; and ii) a second step of substituting a metal sublattice location of the metal oxide for one or more kinds of different metals and may further include iii) a third step of thermally processing metal oxide substituted for other metal in order to adjust the specific surface area and pore size of a porous electrode depending on the kind of electrolyte solution.

Herein, the metal for which the metal oxide is substituted may be transition metal or aluminum (Al), sulfide (S), or tin (Sn) and the overall substitution rate of the metal for which the metal sublattice location of the metal oxide is substituted may be in the range of 10 to 25%.

In addition, the metal oxide configuring the electrochemical capacitor electrode may be manganese dioxide ($MnO_2$) and a sublattice location of manganese (Mn) of manganese dioxide ($MnO_2$) may be substituted for nickel (Ni) and cobalt (Co) and the overall substitution rate of nickel (Ni) and cobalt (Co) may be in the range of 18 to 22%.

The specific surface area of a manganese dioxide metal oxide electrode ($Mn_{1-(x+y)}Co_xNi_yO_2$) substituted with nickel (Ni) and cobalt (Co) is increased by 10 to 15% and the specific capacitance of the manganese dioxide metal oxide electrode ($Mn_{1-(x+y)}Co_xNi_yO_2$) substituted with nickel (Ni) and cobalt (Co) is increased by 15 to 20% in comparison with an unsubstituted manganese dioxide ($MnO_2$) metal oxide electrode.

A metal oxide electrode material of the present invention can increase low electrical conductivity of the existing metal oxide and provide a metal oxide electrode having remarkably increased specific capacitance and energy density by using a metal oxide electrode material substituting a metal sublattice location for one or more kinds of different metals and provide a high-power and high-density super capacitor by using the metal oxide electrode material.

Further, it is possible to provide a metal oxide electrode which can be applied in various fields and purposes by adjusting the specific surface area and pore size of the metal oxide electrode material depending on the kind of the electrolyte solution.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
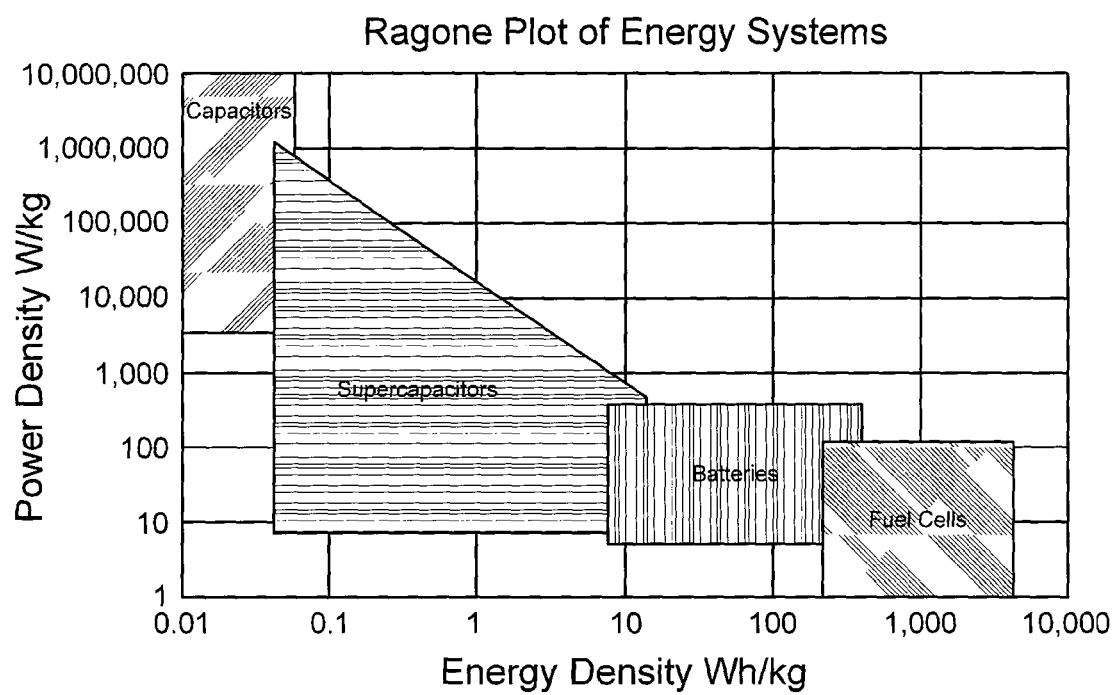
FIG. 1 is a graph showing a correlation between energy density and power density of an energy storage device.
Figure 2:
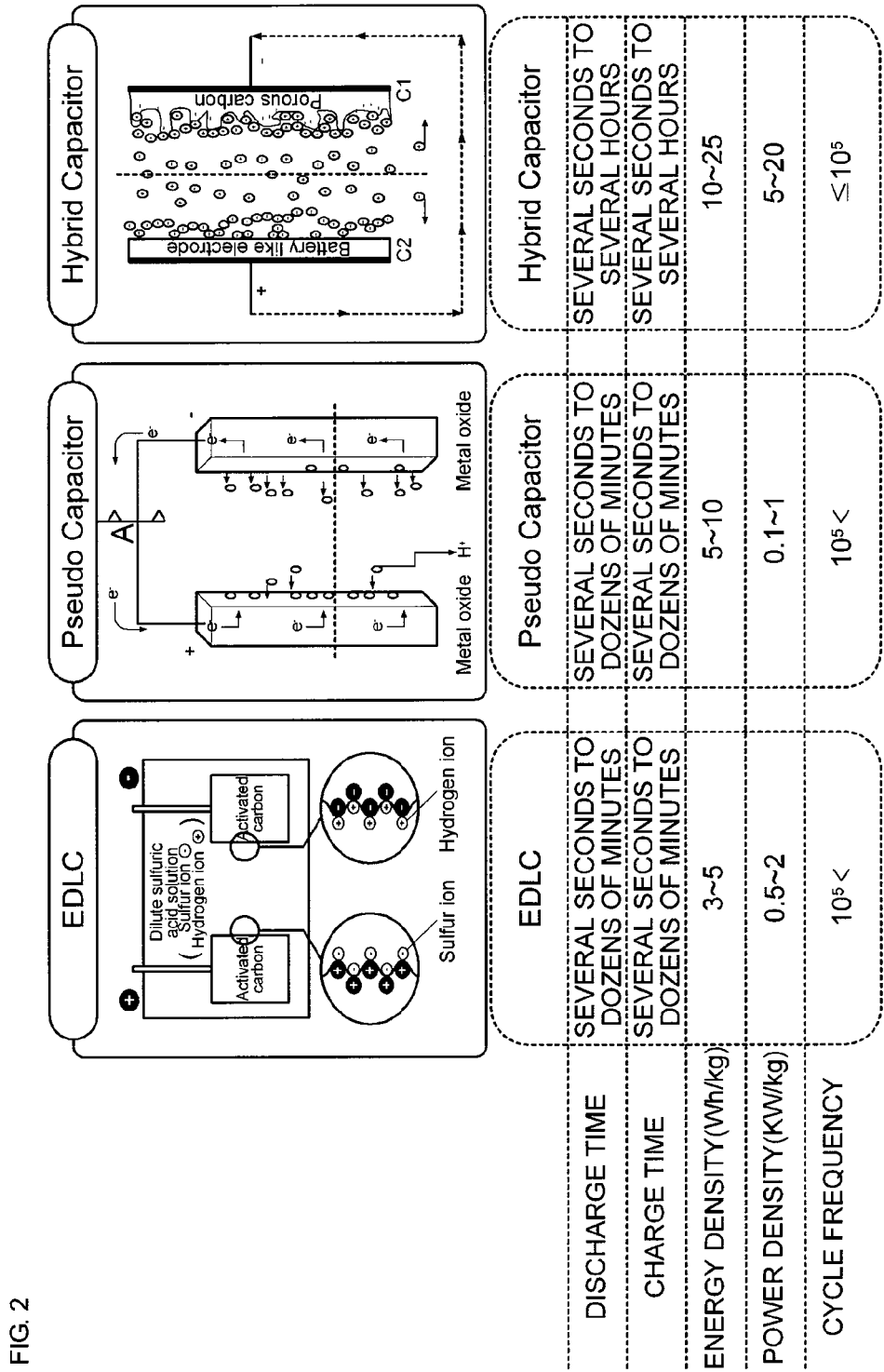
FIG. 2 is a schematic diagram of an electrical double layer capacitor and a schematic diagram showing main characteristics of an electrical double layer capacitor.

Hereinafter, a metal oxide electrode material, an electrochemical capacitor using the same, and a process of producing the same according to the present invention will be described in detail with reference to the accompanying drawings.

An electrochemical capacitor electrode of the present invention is made of a metal oxide electrode material formed by substituting a metal sublattice location of metal oxide for one or more kinds of different metals. Further, porous electrodes constituting the electrochemical capacitor are made of metal oxide formed by substituting the metal sublattice location for one or more kinds of different metals.

A metal ionic valency of a crystallic structure of the metal oxide varies by substituting the metal subslattice location for one or more kinds of different metals and as a result, oxygen deficiency or distortion is caused in the crystallic structure while the crystallic structure is not changed, thereby increasing a specific surface area of the entire metal oxide.

In general, since capacitance is in inverse proportion to a distance between electrodes, but in proportion to the specific surface area of the electrode, the capacitance of the entire capacitor electrode is increased when the specific surface area of the metal oxide electrode is increased by the oxygen deficiency or distortion of the crystallic structure.

Meanwhile, according to a recent research result, it is reported that when a mean particle size of ions which are not dissolved in electrolyte solution is equal to or less than 1 nm, the capacitance rapidly increases. The pore size of the electrode material should be equal to or less than several nms so that the ions contribute to capacitance in the electrolyte solution.

Like the metal oxide electrode material of the present invention, by substituting the metal sublattice location of the metal oxide for one or more kinds of different metals, while the overall specific surface area of the metal oxide electrode increases and the size of a pore decreases, the ions which are not dissolved in the electrolyte solution contribute to the capacitance, thereby increasing the overall capacitance.

At this time, metal which the metal oxide is substituted for may include all transition metals of which an outermost electron has a 3d trajectory, such as titanium (Ti), vanadium (V), chrome (Cr), manganese (Mn), iron (Fe), cobalt (Co), nickel (Ni), copper (Cu), zinc (Zn), or ruthenium (Ru). Further, the metal may include transition metal such as aluminum (Al), sulfide (S), or tin (Sn).

The overall substitution rate of the metals which the metal sublattice location of the metal oxide is substituted for are preferably in the range of 10 to 25% in consideration of the increase of the capacitance by the increase in specific surface area and the decrease in size of the pore and a substantial substitution efficiency of the metal.

Meanwhile, metal oxide for which metals are substituted can include all metal oxide electrodes which can be commercially used for a capacitor, such as oxides of manganese (Mn), ruthenium (Rt), iridium (Ir), nickel (Ni), cobalt (Co), vanadium (V), etc. Preferably, manganese dioxide ($MnO_2$) may be used as the metal oxide by considering high specific capacitance, electrical conductivity, etc.

In case of using manganese dioxide ($MnO_2$) as the metal oxide configuring the electrochemical capacitor electrode, a sublattice location of manganese (Mn) of manganese dioxide ($MnO_2$) can be substituted for nickel (Ni) and cobalt (Co). As a result of verifying an XRD pattern (see FIG. 3) of a manganese dioxide metal oxide electrode ($Mn_{0.8}Ni_{0.1}Co_{0.1}O_2$) substituted with nickel and cobalt, in comparison with the XRD pattern of a manganese dioxide metal oxide electrode (MnO2) which is not substituted, it can be verified that a crystallic structure is not changed after substitution. That is, since another secondary phase is not generated, nickel and cobalt are successfully substituted.

Figure 4:
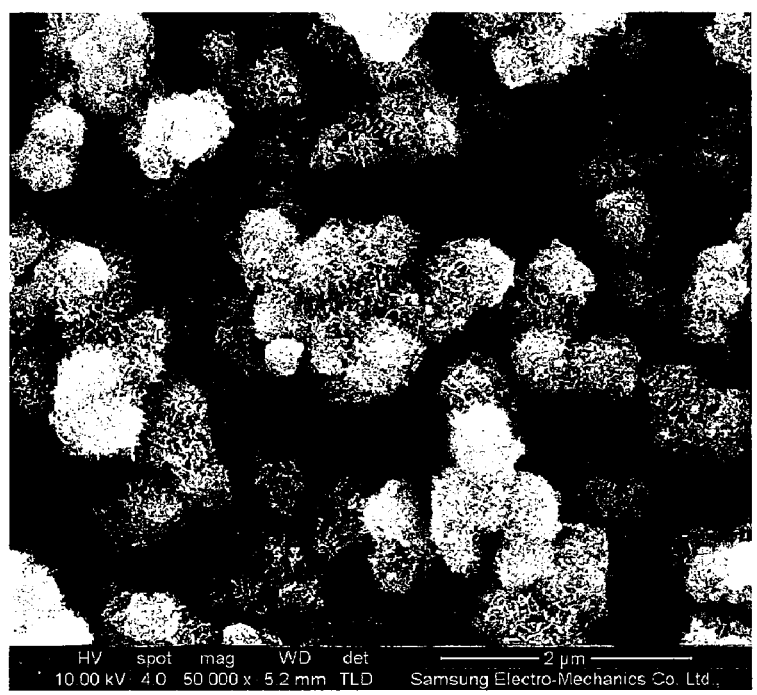
FIGS. 4 and 5 are SEM images of unsubstituted $MnO_2$ and $MnO_2$ substituted with Ni and CO according to an embodiment of the present invention.
Figure 5:
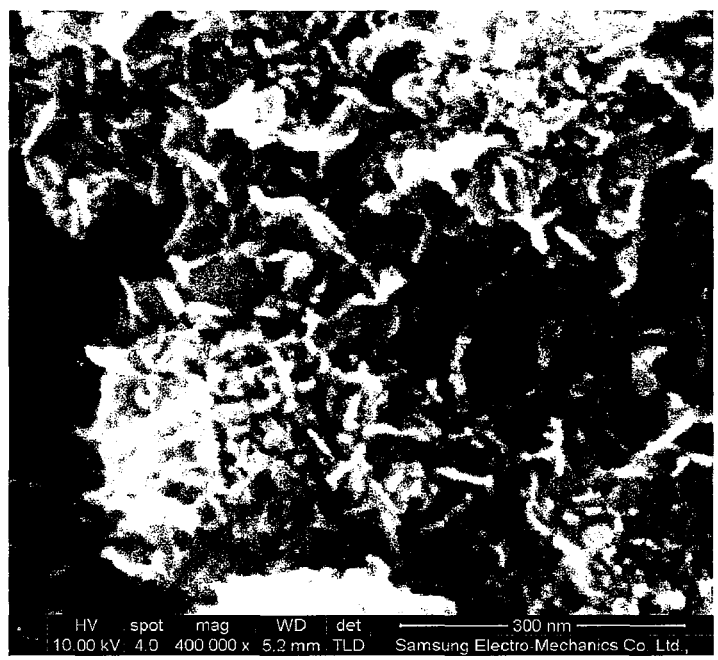

Further, when an SEM image of the unsubstituted manganese dioxide metal oxide electrode ($MnO_2$) is compared with the manganese dioxide metal oxide electrode ($Mn_{0.8}Ni_{0.1}Co_{0.1}O_2$) substituted with nickel and cobalt (see FIGS. 4 and 5), a mean pore size of the manganese dioxide metal oxide electrode ($Mn_{0.8}Ni_{0.1}Co_{0.1}O_2$) substituted with nickel and cobalt is 3.7 nm, the pore size and a surface area of the manganese dioxide metal oxide electrode ($Mn_{0.8}Ni_{0.1}Co_{0.1}O_2$) substituted with nickel and cobalt is smaller than the pore size and surface area of the unsubstituted manganese dioxide metal oxide electrode ($MnO_2$), respectively.

Hereinafter, Table 1 shows variation in specific surface area of a manganese dioxide metal oxide electrode substituted with nickel and cobalt at various composition ratios.

TABLE 1

| Electrode Composition | Specific Surface Area (m$^2$/g) | MnO$_2$ reference (m$^2$/g) |
|---|---|---|
| $Mn_{0.98}Ni_{0.01}Co_{0.01}O_2$ | 161.7 | 160 |
| $Mn_{0.94}Ni_{0.03}Co_{0.03}O_2$ | 165.8 | |
| $Mn_{0.90}Ni_{0.05}Co_{0.05}O_2$ | 166.1 | |
| $Mn_{0.86}Ni_{0.07}Co_{0.07}O_2$ | 173.8 | |
| $Mn_{0.82}Ni_{0.09}Co_{0.09}O_2$ | 177.2 | |
| $Mn_{0.80}Ni_{0.10}Co_{0.10}O_2$ | 177.3 | |
| $Mn_{0.78}Ni_{0.11}Co_{0.11}O_2$ | 176.8 | |
| $Mn_{0.74}Ni_{0.13}Co_{0.13}O_2$ | 170.1 | |

As shown in the above table, it can be verified that a manganese dioxide metal oxide electrode ($Mn_{1-(x+y)}Co_xNi_yO_2$) substituted with nickel and cobalt has a specific surface area larger than a manganese dioxide metal oxide electrode ($MnO_2$) substituted with no metal.

In consideration of an effect of an increase of capacitance by the increase of the specific surface area and the decrease of the pore size and substantial substitution efficiency of metal, the overall substitution rate of nickel and cobalt is preferably in the range of 18 to 22%. At this time, it can be verified that the specific surface area of the manganese dioxide metal oxide electrode ($Mn_{1-(x+y)}Co_xNi_yO_2$) substituted with nickel and cobalt increases by 10 to 15%.

Figure 3:
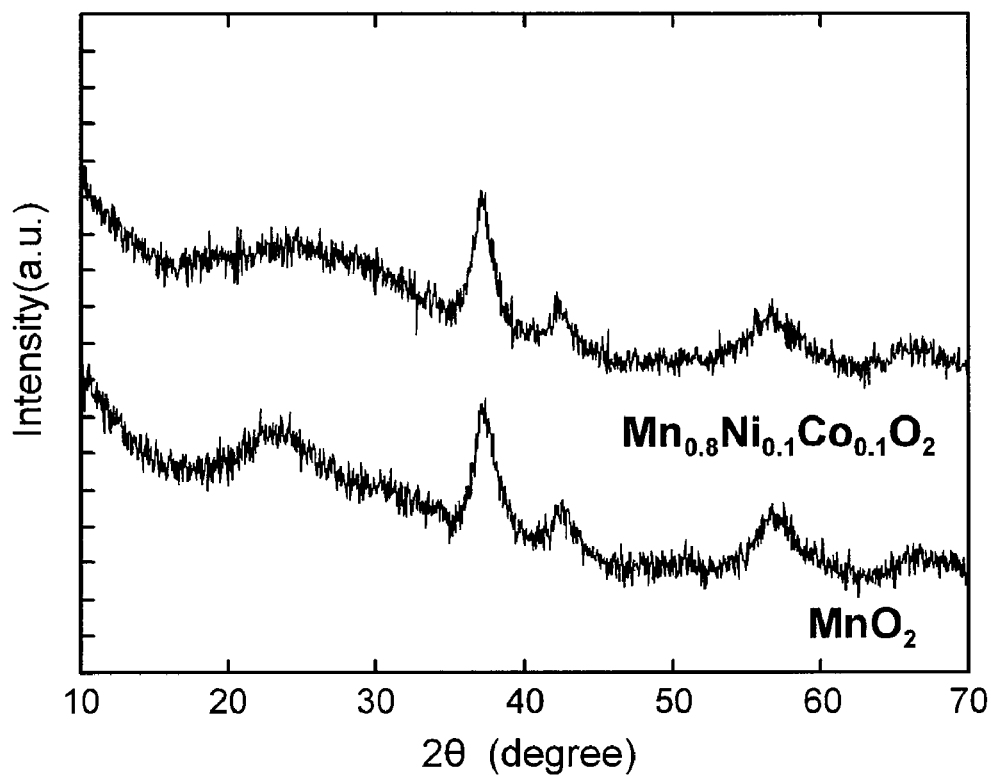
FIG. 3 is a graph comparing and showing an XRD pattern of $MnO_2$ substituted with Ni and CO according to an embodiment of the present invention with unsubstituted $MnO_2$.
Figure 6:
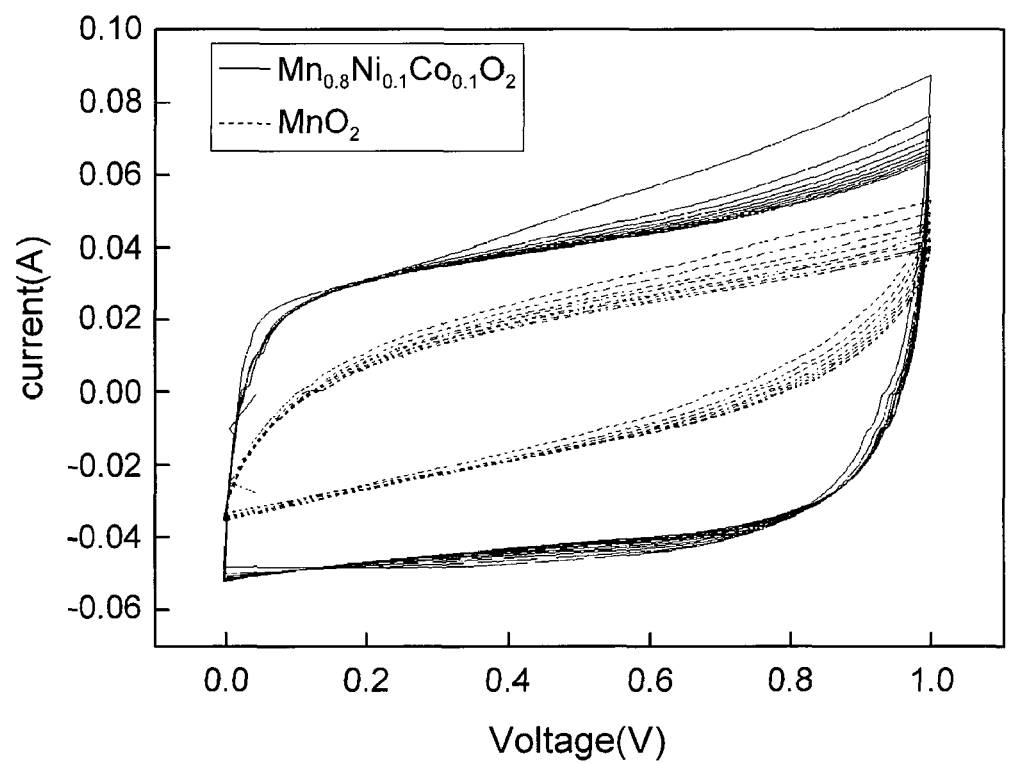
FIG. 6 is a graph showing a voltage-current curve of unsubstituted $MnO_2$ and $MnO_2$ substituted with Ni and CO according to an embodiment of the present invention.

Meanwhile, the specific surface area of the manganese dioxide metal oxide electrode ($Mn_{1-(x+y)}Co_xNi_yO_2$) substituted with nickel and cobalt increases and the pore size decreases, while the specific capacitance increases. As seen in a C—V curve measured by using LiBF4/EC electrolyte solution of FIG. 6, it can be verified that the capacitance is remarkably increased by using the manganese dioxide metal oxide electrode ($Mn_{0.8}Ni_{0.1}Co_{0.1}O_2$) substituted with nickel and cobalt. Further, since a crystallographic structure of metal oxide itself is not almost changed as seen in FIG. 3, the phenomenon in which the capacitance increases is influenced by pure substitution of metal.

Hereinafter, Table 2 shows variation in specific capacitance of a manganese dioxide metal oxide electrode substituted with nickel and cobalt at various composition ratios.

TABLE 2

| Electrode Composition | Specific Capacitance (F/g) |
|---|---|
| $Mn_{0.98}Ni_{0.01}Co_{0.01}O_2$ | 229.4 |
| $Mn_{0.94}Ni_{0.03}Co_{0.03}O_2$ | 230.5 |
| $Mn_{0.90}Ni_{0.05}Co_{0.05}O_2$ | 251.1 |
| $Mn_{0.86}Ni_{0.07}Co_{0.07}O_2$ | 260.8 |
| $Mn_{0.82}Ni_{0.09}Co_{0.09}O_2$ | 270.8 |
| $Mn_{0.80}Ni_{0.10}Co_{0.10}O_2$ | 272.5 |
| $Mn_{0.78}Ni_{0.11}Co_{0.11}O_2$ | 268.2 |
| $Mn_{0.74}Ni_{0.13}Co_{0.13}O_2$ | 260.7 |

As shown in the above table, it can be verified that the specific capacitance of a manganese dioxide metal oxide electrode ($Mn_{1-(x+y)}Co_xNi_yO_2$) substituted with nickel and cobalt increases. In consideration of an effect of an increase of capacitance by the increase of the specific surface area and the decrease of the pore size and substantial substitution efficiency of metal, the overall substitution rate of nickel and cobalt is preferably in the range of 18 to 22%. At this time, it can be verified that the specific capacitance of the manganese dioxide metal oxide electrode ($Mn_{1-(x+y)}Co_xNi_yO_2$) substituted with nickel and cobalt increases by 15 to 20%.

Meanwhile, a method for producing a metal oxide electrode material according to the present invention includes i) a first step of preparing metal oxide; and ii) a second step of substituting a metal sublattice location of the metal oxide for one or more kinds of different metals.

At this time, synthesis of the metal oxide may use all synthesis methods which can be commercially used and preferably, may use a chemical precipitation method in which synthesis is comparatively easy and mass-production is available.

At this time, as described above, metal for which metal oxide is substituted may use all transition metals of which an outermost electron has a 3d trajectory and in addition, may transition metal such as aluminum (Al), sulfide (S), or tin (Sn). Further, all transition oxide electrodes which can be commercially used for a capacitor, such as manganese dioxide ($MnO_2$), etc. which are substituted for metals can be used.

Further, a method for producing a metal oxide electrode material may further include iii) a third step of thermally processing metal oxide substituted for other metal and can adjust the specific surface area and pores size of a porous electrode depending on the kind of electrolyte solution through the step.

Figure 7:
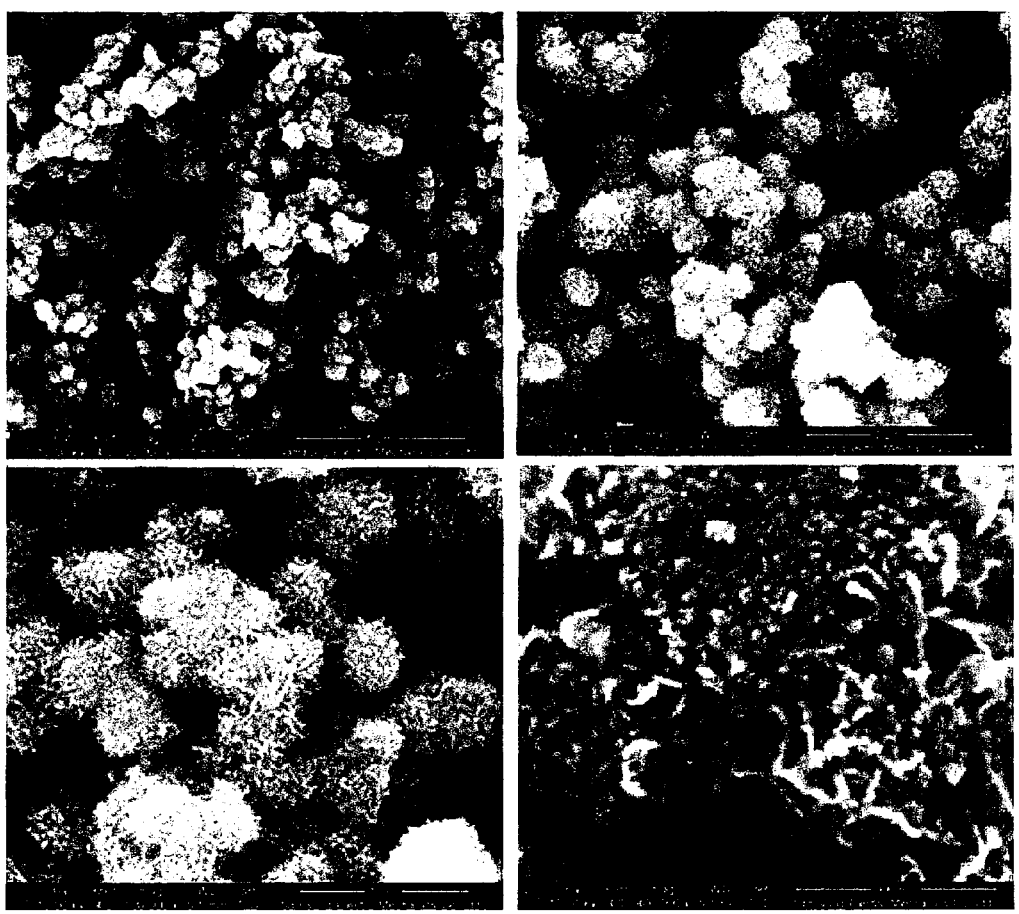
FIGS. 7 and 8 are SEM images showing variations in surface shape and specific surface area depending on thermal processing temperature (250° C., 400° C.) of $MnO_2$ substituted with Ni and CO according to an embodiment of the present invention.
Figure 8:
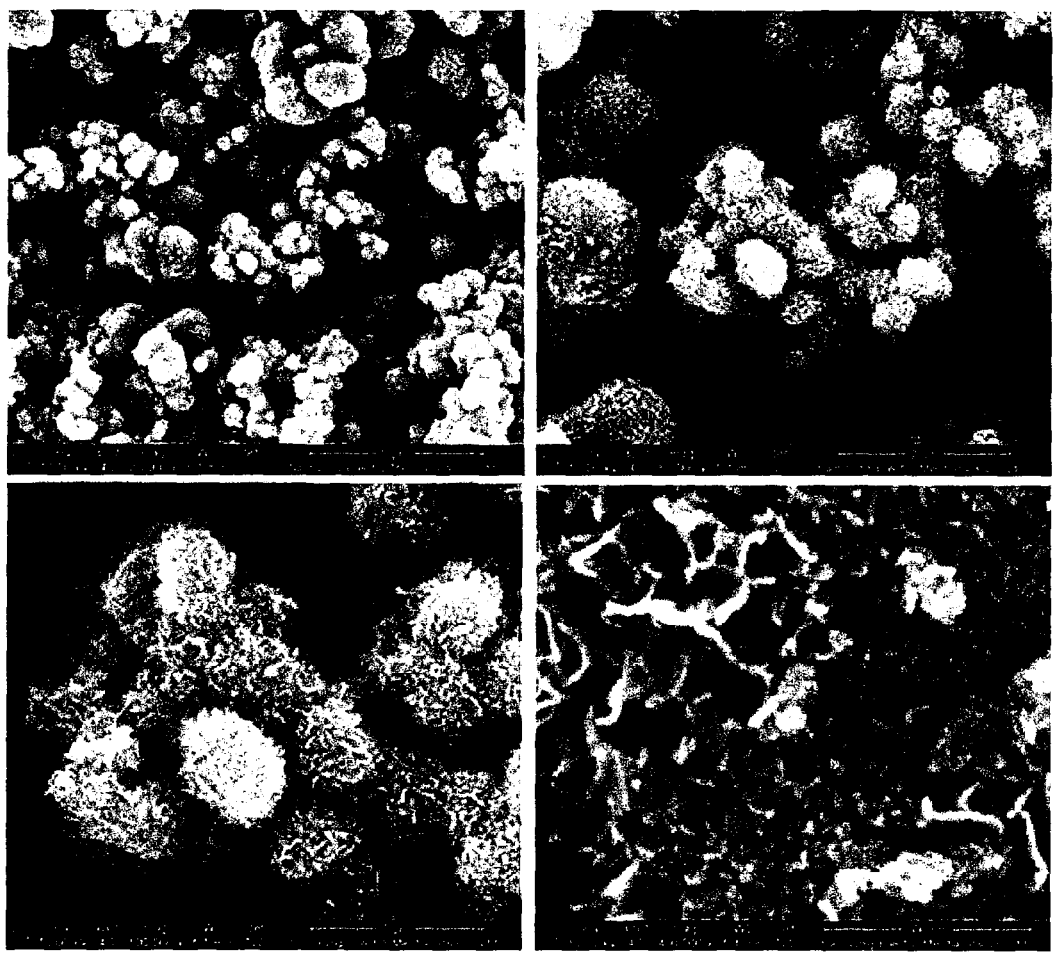

FIGS. 7 and 8 are SEM images showing variations in surface shape and specific surface area depending on thermal processing temperature (250° C., 400° C.) of manganese dioxide metal material ($Mn_{0.8}Ni_{0.1}Co_{0.1}O_2$) substituted with nickel and cobalt according to an embodiment of the present invention.

Figure 9:
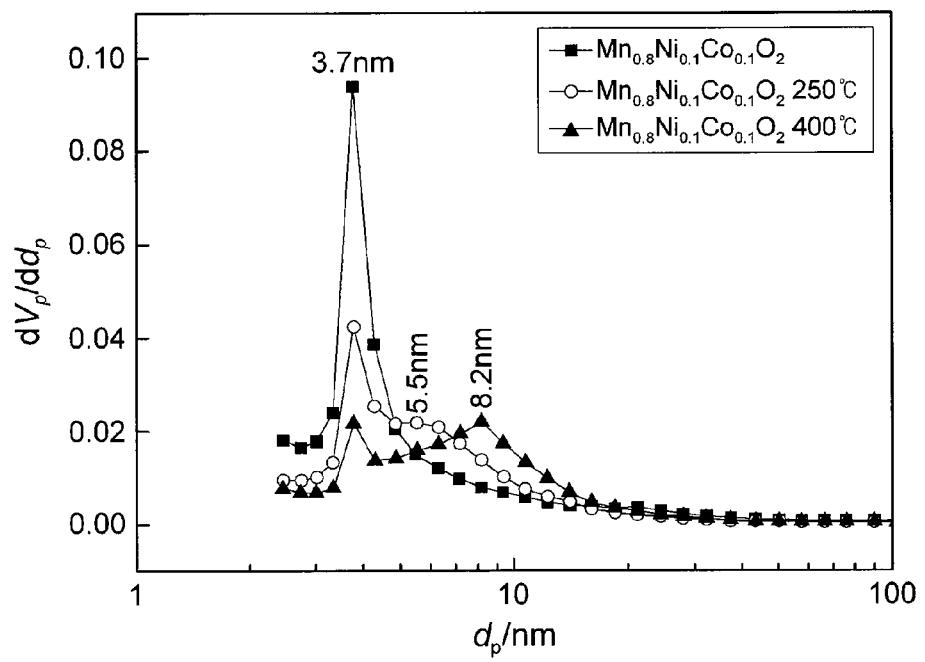
FIG. 9 is a graph showing variations in specific surface area and pore size depending on thermal processing of a manganese dioxide ($Mn_{0.8}Ni_{0.1}Co_{0.1}O_2$) metallic material substituted with Ni and CO according to an embodiment of the present invention.

Further, FIG. 9 and Table 3 are graphs showing variations in specific surface area and pore size depending on thermal processing of a manganese dioxide metallic material ($Mn_{0.8}Ni_{0.1}Co_{0.1}O_2$) substituted with nickel and cobalt according to an embodiment of the present invention and as post-thermal processing temperature increases, the specific surface area decreases and the pore size increases.

TABLE 3

| Electrode Composition | Processing Temperature | Specific Surface Area ($m^2/g$) |
| --- | --- | --- |
| $Mn_{0.8}Ni_{0.1}Co_{0.1}O_2$ | — | 177.3 |
| $Mn_{0.8}Ni_{0.1}Co_{0.1}O_2$ | 250° C. | 131.3 |
| $Mn_{0.8}Ni_{0.1}Co_{0.1}O_2$ | 400° C. | 125.7 |

That is, it is possible to increase the capacitance by adjusting the pore size of an electrode material so that ions which are not dissolved in electrolyte solution can contribute to the capacitance depending on the kind of electrolyte solution which the metal oxide electrode is used.

Figure 10:
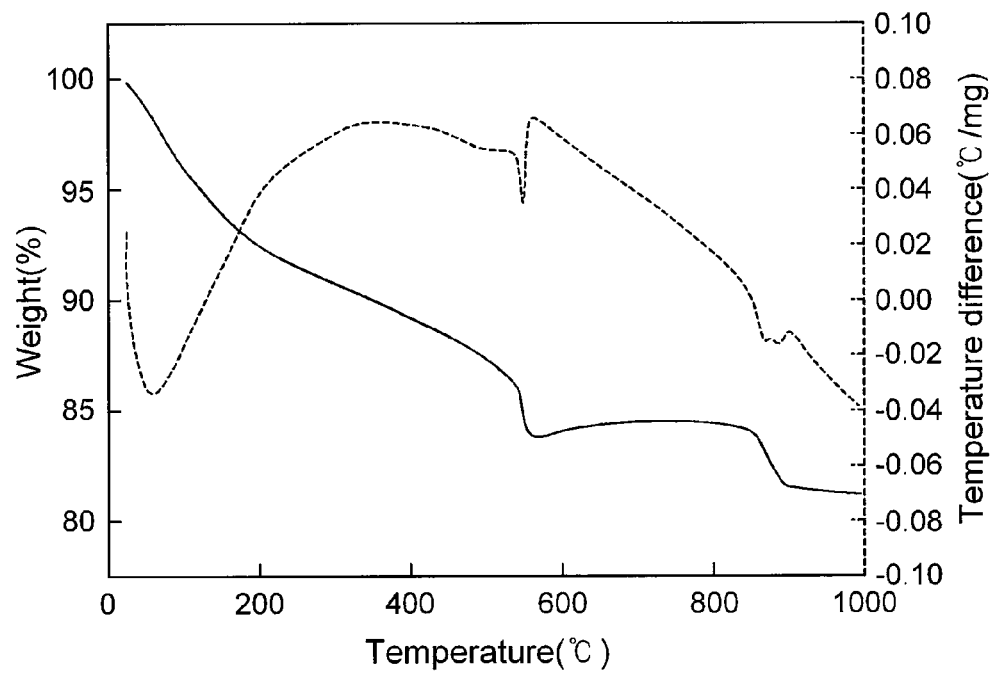
FIG. 10 is a graph showing a crystallic test (TG/DTA) result depending on variation in temperature of a manganese dioxide ($Mn_{0.8}Ni_{0.1}Co_{0.1}O_2$) metallic material substituted with nickel and cobalt according to an embodiment of the present invention.

Meanwhile, FIG. 10 is a graph showing a crystallic test (TG/DTA) result depending on variation in temperature of a manganese dioxide ($Mn_{0.8}Ni_{0.1}Co_{0.1}O_2$) metallic material substituted with nickel and cobalt according to an embodiment of the present invention. As shown in FIG. 10, it can be verified that a phase is changed at 500° C. or less. Accordingly, it is possible to adjust the specific surface area and pore size of a metal electrode in accordance with the kind of electrolyte solution without variation in surface shape and crystallic structure.

Figure 11:
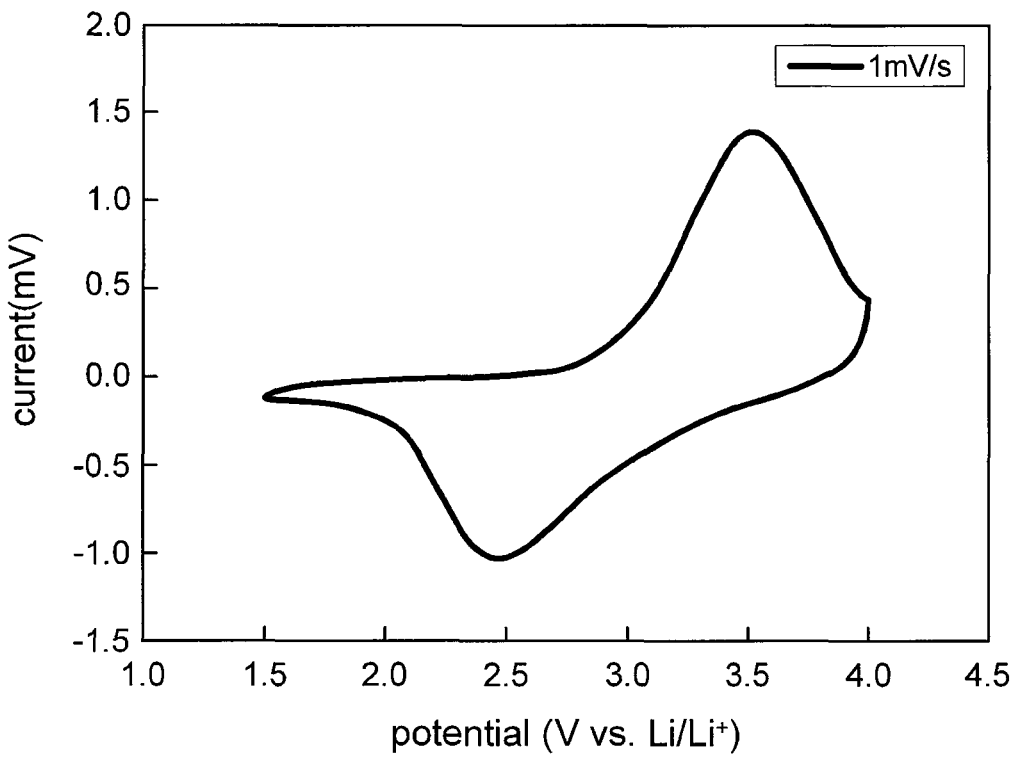
FIG. 11 is a graph showing a voltage-current curve of an manganese dioxide ($Mn_{0.8}Ni_{0.1}Co_{0.1}O_2$) electrode substituted with nickel and cobalt according to an embodiment of the present invention in organic electrolyte solution ($LiClO_4$ in PC)
Figure 12:
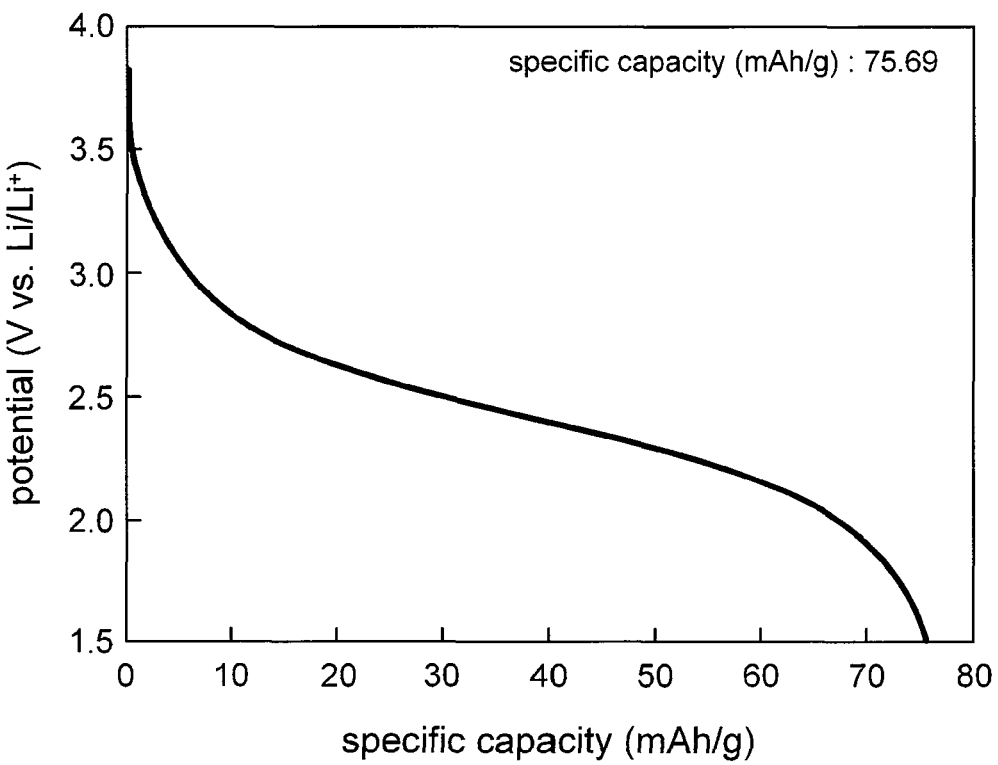
FIG. 12 is a graph showing a specific capacitance-potential curve of an manganese dioxide ($Mn_{0.8}Ni_{0.1}Co_{0.1}O_2$) electrode substituted with nickel and cobalt according to an embodiment of the present invention in organic electrolyte solution ($LiClO_4$ in PC).

Further, FIGS. 11 and 12 are graphs showing a voltage-current curve (FIG. 11) and a specific capacitance-potential curve (FIG. 12) of the manganese dioxide ($Mn_{0.8}Ni_{0.1}Co_{0.1}O_2$) metal electrode substituted with nickel and cobalt according to an embodiment of the present invention in organic electrolyte solution ($LiClO_4$ in PC). As shown in the figures, it is possible to configure a cell within a potential of 2.5V by using a manganese dioxide metal oxide electrode ($Mn_{1-(x+y)}Co_xNi_yO_2$) substituted with nickel and cobalt of the present invention.

As such, it is possible to provide a metal oxide electrode having increased electrical conductivity in comparison with the known metal oxide and having remarkably increased specific capacitance and energy density by using a metal oxide electrode material substituting a metal sublattice location for one or more kinds of different metals and provide a high-power and high-density super capacitor by using the metal oxide electrode material. Further, it is possible to provide a metal oxide electrode which can be applied in various fields and purposes by adjusting the specific surface area and pore size of the metal oxide electrode material in accordance with the kind of the electrolyte solution.

As described above, although the preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. A metal oxide electrode material configuring an electrochemical capacitor electrode,
   wherein a sublattice location of metal is substituted for one or more kinds of different metals, and
   the metal oxide configuring the electrochemical capacitor electrode is manganese dioxide ($MnO_2$) and a sublattice location of manganese (Mn) of manganese dioxide ($MnO_2$) is substituted with nickel (Ni) and cobalt (Co).

2. The metal oxide electrode material of claim 1, wherein the overall substitution rate of nickel (Ni) and cobalt (Co) is in the range of 18 to 22%.

3. The metal oxide electrode material of claim 1, wherein the specific surface area of a manganese dioxide metal oxide electrode ($Mn_{1-(x+y)}Co_xNi_yO_2$) substituted with nickel (Ni) and cobalt (Co) increases by 10 to 15% relative to unsubstituted manganese dioxide metal oxide electrodes.

4. The metal oxide electrode material of claim 1, wherein the specific capacitance of the manganese dioxide metal oxide electrode ($Mn_{1-(x+y)}Co_xNi_yO_2$) substituted with nickel (Ni) and cobalt (Co) increases by 15 to 20% relative to unsubstituted manganese dioxide metal oxide electrodes.

5. An electrochemical capacitor constituted by a porous electrode, an electrolyte, a collector, and a separator, wherein the porous electrode is made of metal oxide of which a metal sublattice location is substituted for one or more kinds of different metals, and the metal oxide configuring the porous electrode is manganese dioxide ($MnO_2$) and a sublattice location of manganese (Mn) of manganese dioxide ($MnO_2$) is substituted with nickel (Ni) and cobalt (Co).

6. The electrochemical capacitor of claim 5, wherein the overall substitution rate of nickel (Ni) and cobalt (Co) for which the sublattice location of manganese (Mn) of manganese dioxide ($MnO_2$) is in the range of 18 to 22%.

7. The electrochemical capacitor of claim 5, wherein the specific surface area of a manganese dioxide metal oxide electrode ($Mn_{1-(x+y)}Co_xNi_yO_2$) substituted with nickel (Ni) and cobalt (Co) increases by 10 to 15% relative to unsubstituted manganese dioxide metal oxide electrodes.

8. The electrochemical capacitor of claim 5, wherein the specific capacitance of the manganese dioxide metal oxide electrode ($Mn_{1-(x+y)}Co_xNi_yO_2$) substituted with nickel (Ni) and cobalt (Co) increases by 15 to 20% relative to unsubstituted manganese dioxide metal oxide electrodes.

* * * * *